US012487028B2

United States Patent
Rizzo, II et al.

(10) Patent No.: US 12,487,028 B2
(45) Date of Patent: Dec. 2, 2025

(54) BEVERAGE COOLER WITH AUTOMATIC DISPENSER

(71) Applicant: BMAX HOLDINGS, LLC, Belleair, FL (US)

(72) Inventors: Benjamin Rizzo, II, Belleair, FL (US); Bennett Rizzo, Belleair, FL (US)

( * ) Notice: Subject to any disclaimer, the term of this patent is extended or adjusted under 35 U.S.C. 154(b) by 0 days.

(21) Appl. No.: 18/556,785

(22) PCT Filed: Aug. 12, 2022

(86) PCT No.: PCT/US2022/040161
§ 371 (c)(1),
(2) Date: Oct. 23, 2023

(87) PCT Pub. No.: WO2023/018936
PCT Pub. Date: Feb. 16, 2023

(65) Prior Publication Data
US 2024/0200865 A1  Jun. 20, 2024

Related U.S. Application Data

(60) Provisional application No. 63/232,554, filed on Aug. 12, 2021.

(51) Int. Cl.
F25D 31/00 (2006.01)
(52) U.S. Cl.
CPC ........ F25D 31/002 (2013.01); *F25D 2201/10* (2013.01); *F25D 2331/806* (2013.01); *F25D 2600/00* (2013.01)

(58) Field of Classification Search
CPC . F25D 31/002; F25D 3/06; F25D 3/08; F25D 2201/10; F25D 2331/806;
(Continued)

(56) References Cited

U.S. PATENT DOCUMENTS 445,667 A * 2/1891 Beacham ................. F25D 7/00
62/304
3,692,180 A * 9/1972 LaRaus .................... C02F 1/78
210/139
(Continued)

FOREIGN PATENT DOCUMENTS

CN  201557890 U  8/2010
CN  206777180 U  12/2017
(Continued)

OTHER PUBLICATIONS

Pump2Pour Beverage Container, found online at https://nicetumblers.com/pump2pour/, unknown publication date. (Printout submitted herewith.).
(Continued)

*Primary Examiner* — Tavia Sullens
(74) *Attorney, Agent, or Firm* — UNDERWOOD & ASSOCIATES, LLC

(57) ABSTRACT

A cooler assembly includes an insulted main container and a pump assembly configured to pump contents of the main container through a tube to a spigot. An electronic control board includes a pressure-sensing switch that senses pressure differentials or fluid movement when the spigot is opened and closed, causing a triggering event. Triggering events are used to activate and deactivate the pump to dispense fluid from the main container.

19 Claims, 6 Drawing Sheets

(58) Field of Classification Search
CPC . F25D 2600/00; B67D 1/0801; B67D 1/0829; B67D 1/0835; B67D 2001/0097; B67D 2001/0812; B67D 2210/00128
See application file for complete search history.

(56) References Cited

U.S. PATENT DOCUMENTS

| | | | | |
|---|---|---|---|---|
| 6,305,185 | B1 * | 10/2001 | Sloan | F25D 3/08 62/235.1 |
| 2003/0136797 | A1 | 7/2003 | Thomason | |
| 2007/0193297 | A1 * | 8/2007 | Wilson | F25D 29/00 62/457.2 |
| 2010/0106229 | A1 | 4/2010 | Gammons et al. | |
| 2013/0025316 | A1 * | 1/2013 | Wheeless | F25D 3/08 62/441 |

FOREIGN PATENT DOCUMENTS

| | | | | |
|---|---|---|---|---|
| CN | 107560778 | A * | 1/2018 | |
| CN | 207666445 | U | 7/2018 | |
| CN | 110693282 | A | 1/2020 | |
| TW | M241132 | U * | 8/2004 | |
| WO | WO-2010091454 | A1 * | 8/2010 | F04B 49/08 |

OTHER PUBLICATIONS

"American Beverage 4 Faucet Beer Cooler Outdoor Picnic Party Dispenser", found online at https://rapidswholesale.com/cold-plate-beer-coil-cooler.html, unknown publication date. (Printout submitted herewith.).

"nICE 1-Gallon Container", found online at https://www.lowes.com/pd/nICE-1-Gallon-Beverage-Cooler/1002250050, unknown publication date. (Printout submitted herewith.).

United States Patent and Trademark Office, International Search Report for PCT/US22/40161, Nov. 2, 2022, Alexandria, Virginia, U.S.A.

United States Patent and Trademark Office, Written Opinion of the ISA for PCT/US22/40161, Nov. 2, 2022, Alexandria, Virginia, U.S.A.

* cited by examiner

BEVERAGE COOLER WITH AUTOMATIC DISPENSER

CROSS REFERENCE TO RELATED APPLICATIONS

This application claims priority to, and the benefit of International Patent Application Serial Number PCT/US22/40161, filed Aug. 12, 2022, which claims priority to, and the benefit of U.S. Provisional Patent Application No. 63/232,554, filed on Aug. 12, 2021, the contents of both of which are incorporated by reference in their entirety as if fully set forth herein.

STATEMENT REGARDING FEDERALLY SPONSORED RESEARCH OR DEVELOPMENT

None.

TECHNICAL FIELD

This disclosure relates to a beverage cooler having an automatic dispenser. In particular, this disclosure relates to a beverage cooler having a built-in pump system that transports contents from the bottom of the cooler to a hand-held, actuatable spigot.

BACKGROUND

As their name implies, coolers are typically used to keep foods, drinks and other consumables cool or cold. Coolers are available in many shapes and sizes, e.g., cylindrical, rectangular, etc. with varying degrees of potential or ability to keep their contents at or below an ambient temperature.

Cylindrical, stand-up type coolers are commonly used to hold liquid contents. Such coolers typically include a spigot at or near the bottom of the container that is actuatable to allow contents from the cooler to be dispensed therefrom.

In such cases, gravity is the force that allows the cooler contents to be dispensed. It follows that even if one were to attach a tube to the spigot, one cannot fill a cup or glass from the cooler if that container is above the level of the liquid in the cooler. Accordingly, to allow persons to fill a cup or glass from the cooler from a comfortable standing position, one must place the cooler at an elevated position (usually so that the spigot is at least at the height of a person's waist). Such a scenario poses at least two problems: first, the cooler may be heavy when filled with liquid contents and therefore difficult and cumbersome to lift; secondly, the cooler may stand a greater risk of falling over, thereby spilling its contents and possibly causing damage, if it is not on a steady surface.

Containers such as beer kegs permit an inner container to be pressurized, usually through the use of a hand pump. Such a system thereby relies on pressure to dispense contents rather than gravity. However, kegs are prone to over-pressurizing by users and causing beer, in particular, to foam.

Accordingly, a cooler that is configured to keep its contents cool and provide dispensing from a hand-held spigot without the requirements of gravity and/or pressurization of the interior of the cooler is an unmet need in the art.

SUMMARY

In general, an automatic dispensing cooler (hereinafter 'cooler') is disclosed. In one embodiment, the cooler includes a container body having an upper portion and a lower portion, the cooler being configured to store liquid contents. In this embodiment, the cooler includes an electric pump system disposed in the lower portion, beneath the bottom-most part of the container body. An aperture in the floor of the container permits liquid contents to be delivered via one or more tubes to the electric pump system. The electric pump system is configured to pump the liquid contents through an exteriorly-disposed tube and spigot assembly. The distal end of the tube assembly includes a manually-actuated spigot from which liquid contents may be dispensed. In this embodiment, the electric pump assembly is configured to detect a pressure differential that occurs within the tubing that connects the spigot to the pump, when a plunger of the spigot is actuated.

In a first embodiment, a cooler includes a thermally-insulated main container, including a floor and an adjacent wall perpendicular to the floor. The main container is configured to retain a volume of a liquid. The cooler further includes an electronics chamber disposed below the floor of the main container, a fluid inlet in fluid or atmospheric communication with the main container, and a fluid outlet. The cooler further includes a pump, disposed within the electronics chamber, configured to pump fluid from the fluid inlet to the fluid outlet, a length of tubing having proximal and distal end portions, wherein the proximal end portion is connected to the fluid outlet, and the distal end is connected to a spigot: and an electronic control operatively connected to the pump to cause activation and cessation of the pump.

In one embodiment, the main container includes an outer shell, and the outer shell includes a recessed groove configured to receive and securely hold the length of tubing. In a related embodiment, a cross-sectional diameter of the groove can match a cross-sectional diameter of the tubing. The recessed groove can include at least one area wherein a cross-sectional circumference is greater than a cross-sectional diameter of the tubing, so that the recessed groove assumes a cross-sectional "C" shape. In this embodiment, the recessed groove circumferentially disposed on the outer shell. The recessed groove can include a proximal end portion beginning at or near the fluid outlet that extends upwardly along a circumferential pathway about the outer shell. A distal end portion of the recessed groove terminates at or near a top portion of the main container in this embodiment.

In one embodiment, the electronic control includes at least one processor, at least one memory, at least one input/output port, a power source, and at least one micro-pressure switch. In this embodiment, the at least one micro-pressure switch is in fluid communication with the pump, the tubing, or both. The micro-pressure switch is configured to activate when a pressure change is detected within a fluid reservoir of the pump, the tubing, or both. When the micro-pressure switch is activated, the electronic control is configured to send an activation signal to activate the pump via the one or more input/output ports. The electronic control is configured such that upon the micro-pressure switch detecting a second, subsequent pressure change, a deactivation signal is sent to the pump.

In one embodiment, the power source includes one or more rechargeable batteries. In this embodiment, a power input is disposed on an exterior wall of the cooler that is in electronic communication with, and configured for recharging the one or more rechargeable batteries. The cooler can further include a power output disposed on an exterior wall of the cooler that is in electronic communication with the one or more rechargeable batteries.

In one embodiment, the cooler further includes a recess for reversibly securing the spigot, wherein a first portion of the recess is disposed on an exterior wall of the main container, and a second portion of the recess is disposed on an exterior wall portion of the lid. In such an embodiment, the lid is prevented from being removed from the main container when the spigot is disposed within the recess.

In a second embodiment, a beverage cooler includes a thermally-insulated main liquid storage chamber and an electronics chamber disposed beneath the main liquid storage chamber and separated by a floor portion of the main chamber, a pump disposed within the electronics chamber, configured to pump the liquid from the main liquid storage chamber to a pump outlet, a length of tubing having a proximal end connected to the pump outlet and a distal end connected to a manually-activated spigot, and an electronic control including a micro-pressure switch configured to activate upon detection of a change in pressure within the length of tubing, the pump, or both. The pump is configured to pump the liquid from the main liquid storage chamber to the pump outlet when the micro-pressure switch is activated.

In one embodiment, the cooler further includes a recessed groove extending from the pump outlet to a top portion of the main liquid storage chamber that is configured to engage and secure the length of tubing therein. In a related embodiment, the cooler further includes a spigot recess for securely engaging the spigot, wherein the spigot recess is partially formed on a top portion of the main liquid chamber, and partially formed on an outer wall portion of a lid member configured to be reversibly engaged with the main liquid chamber.

In yet another embodiment, a beverage cooler includes a thermally insulated, main liquid storage chamber, a pump, the pump including an inlet in fluid communication with the main liquid storage chamber, and an outlet in fluid communication with an actuatable fluid dispenser and an electronic pressure-sensing switch. The cooler further includes an electronic control in signal communication with the pressure-sensing switch and the pump. The electronic control is configured to activate the pump upon receiving a first signal from the pressure-sensing switch and deactivate the pump upon receiving a second signal from the pressure-sensing switch.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

DESCRIPTION OF DRAWINGS

The present embodiments are illustrated by way of the figures of the accompanying drawings, which may not necessarily be to scale, in which like references indicate similar elements, and in which.

DETAILED DESCRIPTION OF ILLUSTRATIVE EMBODIMENTS

Figure 1:
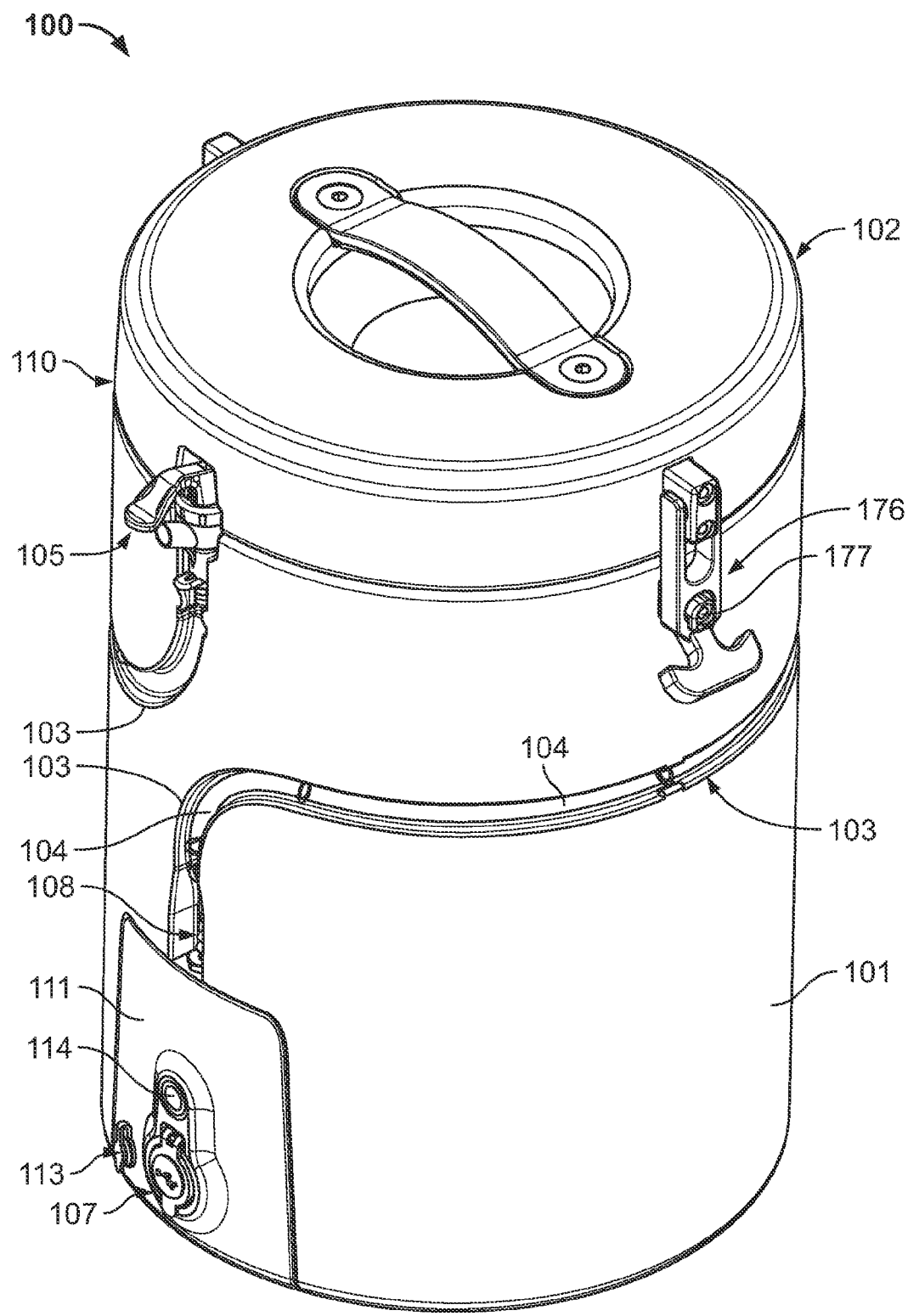
FIG. 1 is a perspective view of a cooler assembly according to one embodiment.

FIG. 1 is a cooler assembly (hereinafter 'cooler') 100 according to one embodiment. In this embodiment, the cooler 100 includes a thermally insulated container body 101 having a thermally insulated lid portion 102. In this embodiment, the lid portion 102 and an upper portion 110 of the container body 101 are configured to engage with one another, so that the lid portion 102 may be secured onto the container body 101. For example, in this embodiment, first (175) and second (176) elastic handle members are attached to the lid portion. Each handle member includes an aperture configured to engage a respective finger 177, 178 disposed on the container body 101 as illustrated. In this embodiment, the handles may be stretched such that the apertures engage the fingers to hold the lid securely on the container body. An elastomer gasket is disposed in the interface where the lid 102 and container body 101 confront in a closed configuration as illustrated, e.g., in FIG. 1. In a different embodiment, the container body 101 and the lid portion 102 can be formed with cooperating threads so that the lid portion can be threaded onto the upper portion 110 of the container body 101 to form an air-tight seal therebetween.

Figure 2:
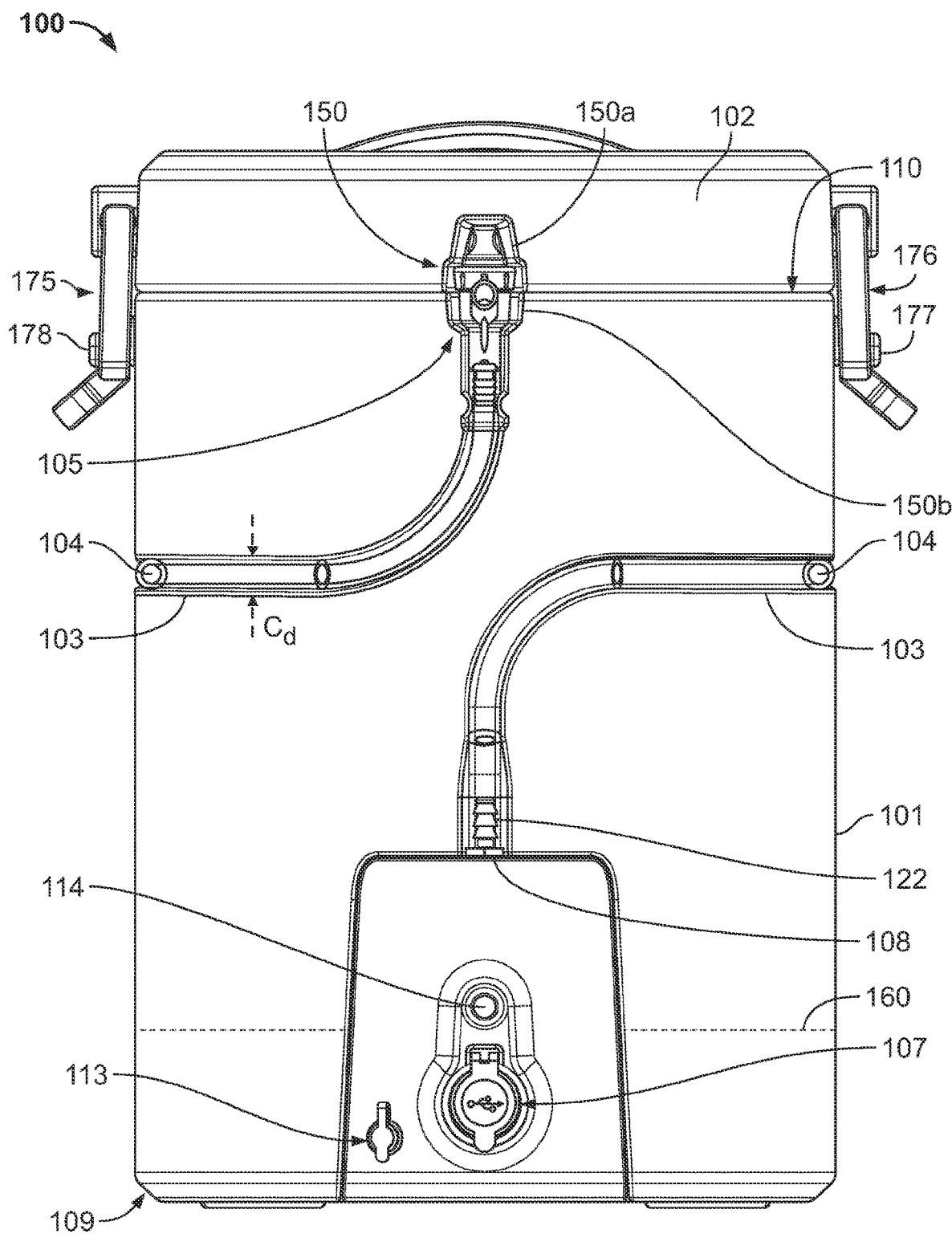
FIG. 2 is front view of the cooler assembly shown in FIG. 1.
Figure 3:
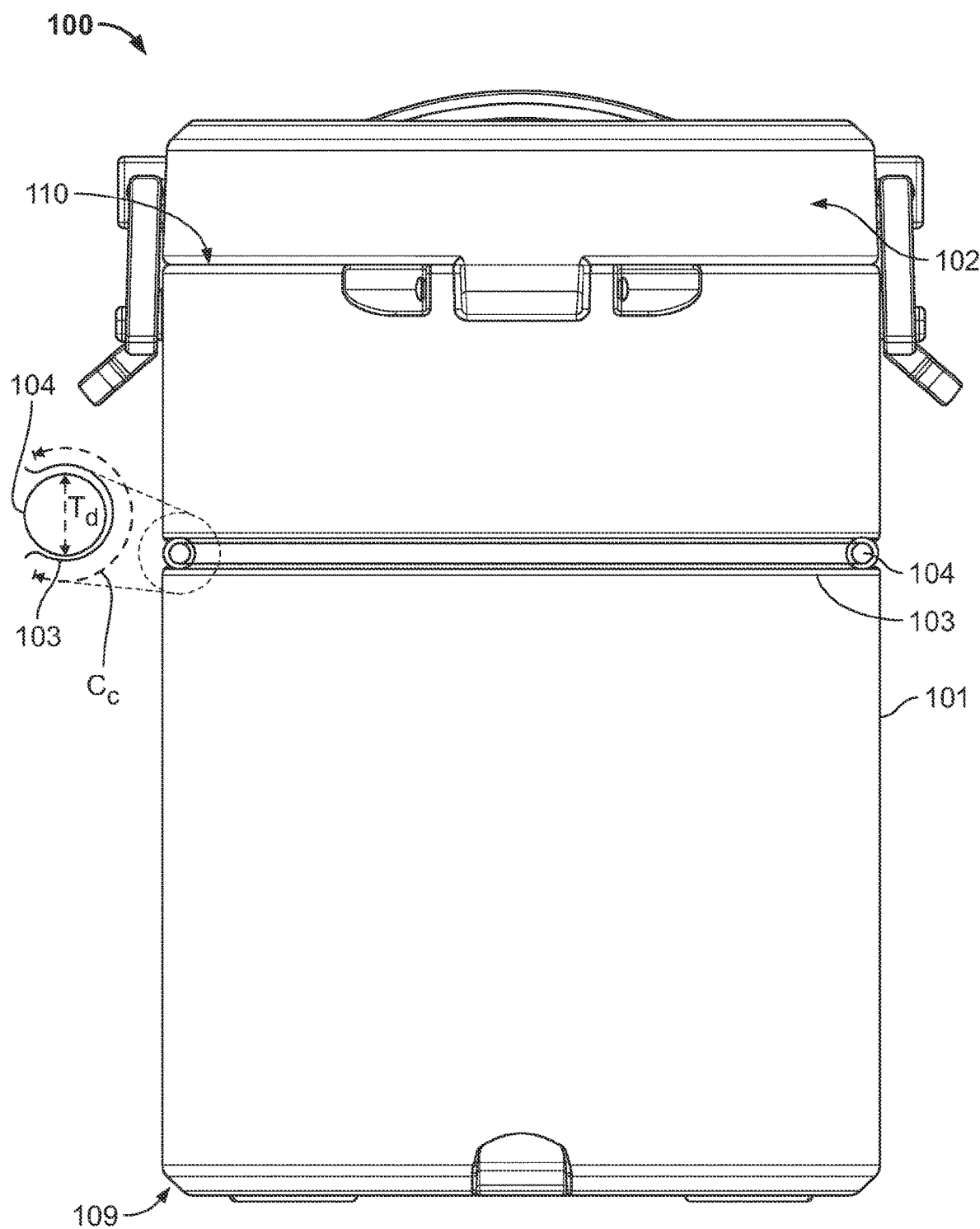
FIG. 3 is a rear view of the cooler assembly shown in FIG. 1.

In this embodiment, the container body 101 includes a recessed tube channel 103 that extends from a distal pump outlet 108 to a spigot 105. In this embodiment, at least a portion of the recessed channel 103 is configured to frictionally engage and hold a tube 104 that connects the distal pump outlet 108 to the spigot 105. For example, the recessed tube channel 103 can have a diameter $C_d$ as illustrated in FIG. 2 that is equal, or nearly equal to the cross-sectional diameter of the tube 104. Referring to FIG. 3, in this or other embodiments, the partial cross-sectional circumference $C_c$ of the tube channel 103 can be greater at one or more locations than the diameter $T_d$ of the tube 104 such that the tube channel 103 adopts a "C" shape around the tube 104. In such an embodiment, the tube 104 can be urged into the tube channel 103 and held in place, similar to a snap-fit connection. In this embodiment, the pump output 108 is in the form of a barb connection 122; however, it should be understood that other alternative tube attachments may be used.

Referring to FIGS. 1-3, in this embodiment the recessed tube channel 103 extends circumferentially around the exterior of the container body 101, such that the tube 104 terminates at spigot 105 at an uppermost tube elevation. In other words, the spigot 105 and the terminal end of tube 104 where the spigot is connected, is disposed above all other portions of the tube 104. This configuration can reduce the likelihood of accidental drainage and formation of bubbles within the tube 104. The 'wrap-around' configuration of the tube 104 also provides a convenient and tidy storage location for the tube 104 and spigot 105.

In this embodiment, a spigot stowage recess 150 is formed in the combination of the lid portion 102 and the upper portion 110 of the container body 101: a first half 150a of the stowage recess is disposed in the lid portion 102, while a second half 150b of the stowage recess is disposed in the container body 101 as particularly shown in FIG. 2. In embodiments with a screw-on lid, the lid portion 102 can be threaded onto the upper portion 110 until the recess halves 150a, 150b line up to form the spigot stowage recess 150, thereby allowing the spigot 105 to be stored therein. In such an embodiment, lid portion 102 is thereby prevented from being unthreaded (i.e., unscrewed) from the container body 101 when the spigot 105 is firmly engaged within recess 150. In this way, the stored spigot 105 serves to lock the lid portion 102 to the container body 101.

In this embodiment, like recess channel 103, the spigot stowage recess is configured to frictionally engage the spigot, thereby holding it in place. In one example, the stowage recess 150 can be formed from a semi-malleable plastic that allows a snap-fit between the spigot and the recess 150.

Figure 4:
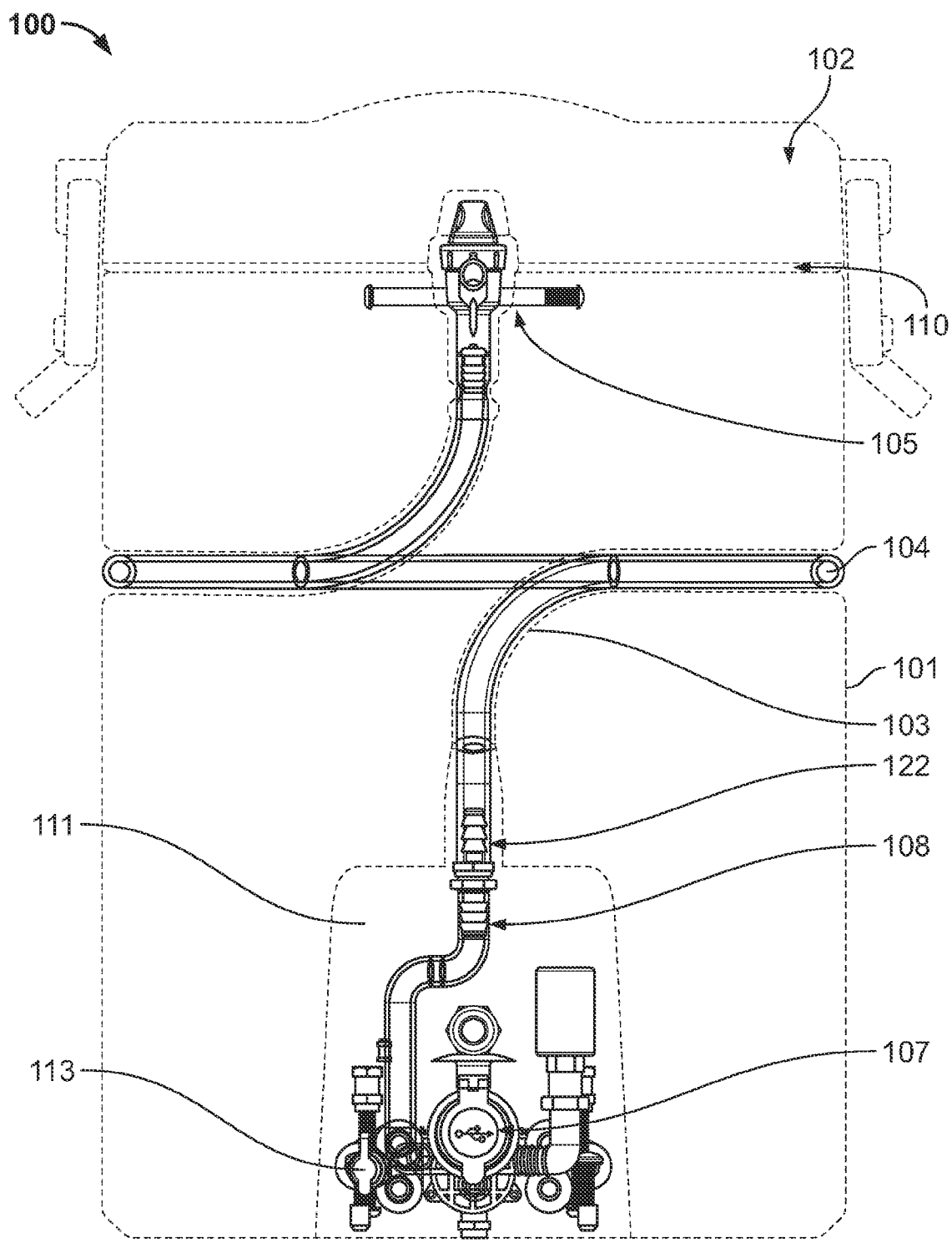
FIG. 4 shows select internal components of a cooler assembly according to one embodiment.
Figure 5:
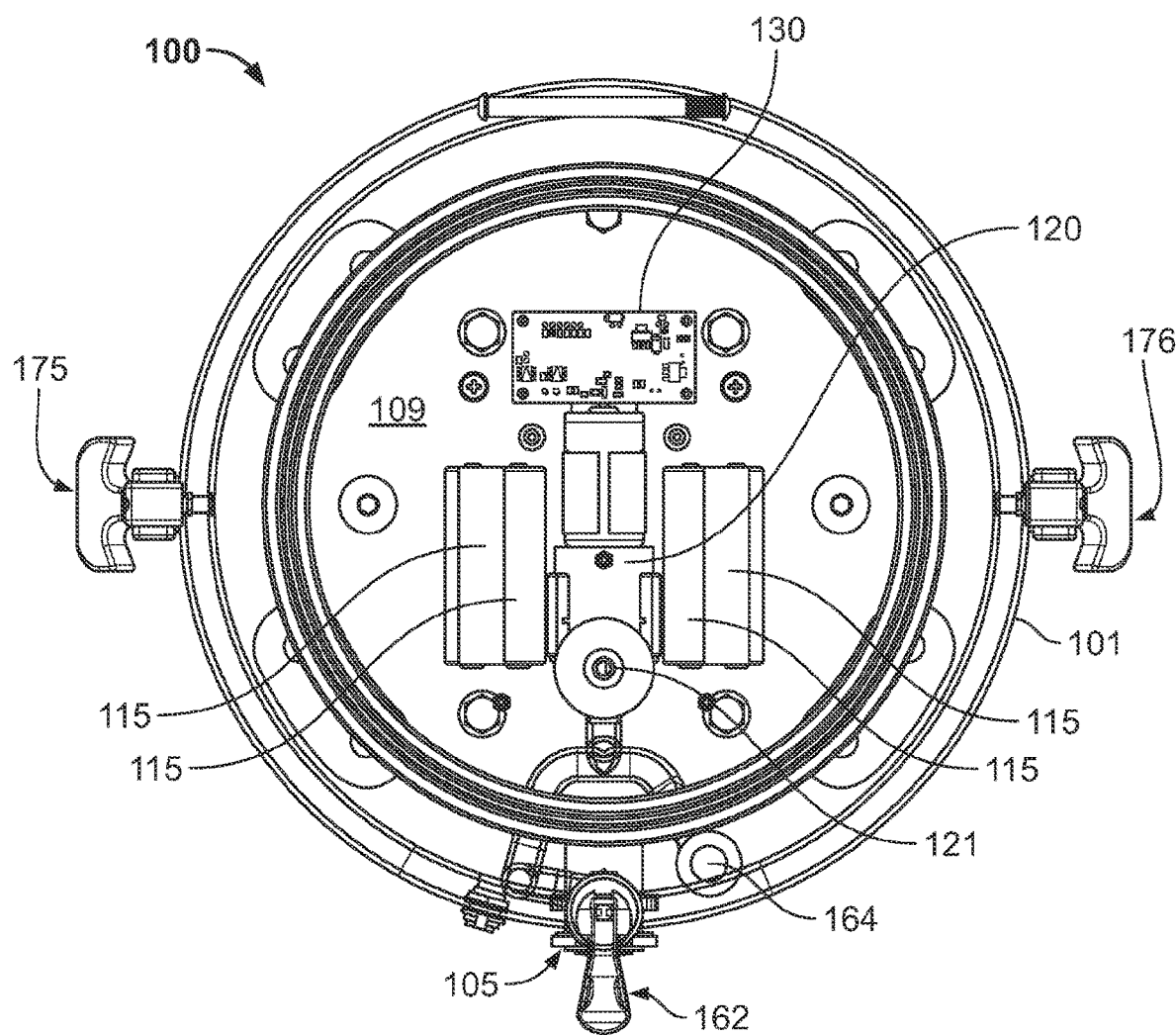
FIG. 5 shows select pump components of a cooler pump, according to one embodiment.

Referring now to FIGS. 2, 4 and 5, in this embodiment, the cooler 100 includes a battery-operated pump (hereinafter 'pump') 120. The pump 120 is disposed between a bottom 109 of the cooler 100 and a floor 160 of the main container 101 such that it is housed in a liquid-proof environment beneath the main container 101. (For clarity, the floor of the main container 101 is not expressly illustrated in the figures; however, the approximate location is illustrated by the dashed line in FIG. 2.)

In this embodiment, the pump 120 is configured to receive liquid contents from the main container 101 through an inlet orifice 121 in fluid communication with the main container 101. The inlet orifice 121 can be configured as a direct inlet into the main container 101 or an extension member such as a barb may be used to span the inlet orifice 121 and an inlet aperture of the main container 101. In this embodiment, the pump 120 is further configured to pump the liquid contents received from the inlet orifice 121 to the distal pump outlet 108 with ample force to reach the spigot 105. In this embodiment, the pump 120 is powered by two sets of three rechargeable batteries 115: however, it should be understood that alternative options for powering pump 120 are equally contemplated. For example, pump 120 could be configured to be powered by an AC power source: alternatively, the main container 101 or the lid portion 102, or both, could include one or more solar arrays configured to deliver solar-generated electric current to the batteries 115 for charging.

In this embodiment, the main container 101 includes a power inlet 113. In this embodiment, the power inlet 113 is configured to receive both 12V and 110V, although other configurations are equally contemplated. The power inlet 113 can be configured to charge the rechargeable batteries 115, power an electronic logic board 130 (discussed below) or both. A USB power outlet 107 is configured to provide power output for powering accessory devices such as radios, personal electronic devices, etc. Front plate 111 allows access to the electronics chamber, should the need arise.

Figure 6:
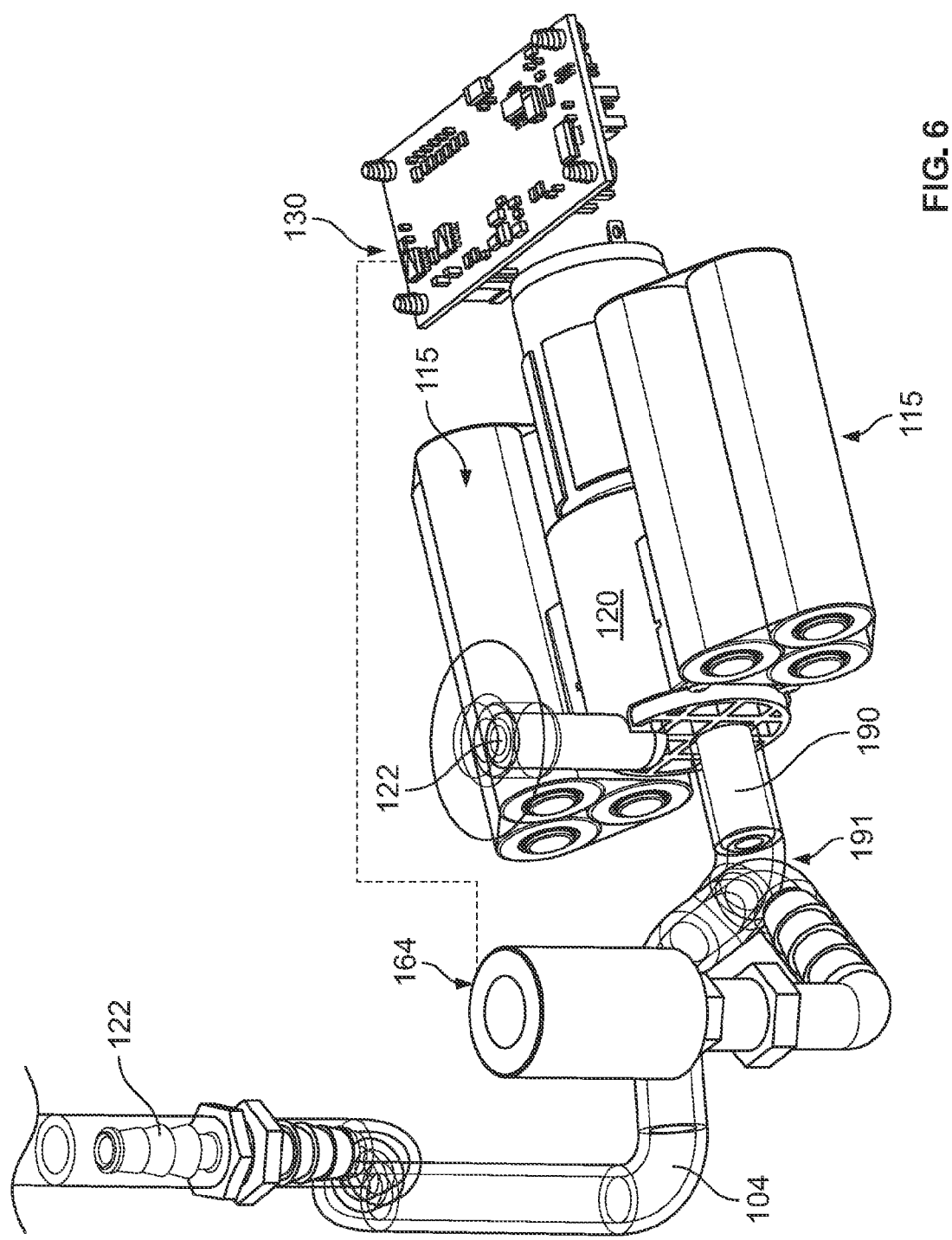
FIG. 6 illustrates select electronic components of a cooler assembly according to one embodiment.

Referring now to FIG. 6, select electronic components of the cooler 100 are illustrated. Other components of the cooler 100 are excluded for the purpose of figure clarity. In this embodiment, the cooler 100 includes an electronic logic board 130. The logic board 130 is configured to receive operating power from the batteries 115 and serves to control operation of the pump 120, among other functions. A main ON/OFF switch 114 is configured to toggle the electronic components of the cooler on and off.

In this embodiment, the logic board 130 is in electronic signal communication with a micro-pressure switch 164 (illustrated by way of the dashed line in FIG. 6) that is plumbed into the pump outlet 190 via a tee 191 shared between the micro-pressure switch 164 and tube 104 as illustrated. The logic board 130 is configured to activate or deactivate the pump 120 upon receiving certain triggering signals. A first triggering event (signal) can be caused, e.g., by a user depressing the plunger 162 of spigot 105, thereby causing a decrease in pressure within the tube 104. The micro-pressure switch 164 senses the pressure drop and transmits a trigger signal to the logic board 130 to turn the pump 120 on to dispense the contents of the main container 101. When a user subsequently releases the plunger 162 of spigot 105, pressure within the tube 104 rises, causing a second triggering event to turn the pump off. One non-limiting example of a micro-pressure switch that may be used in this and other embodiments is part number XYK-114S-N1-O-005-W-260 available from Yueqing Sencon Electrical Co., Ltd., Yueqing, Zhejiang, China.

In this embodiment, the logic board 130 is further configured to activate the pump 120 upon detecting a first micro-pressure switch triggering event, and stop the pump upon receiving a second, subsequent micro-pressure switch triggering event. The first triggering event can be, for example, a pressure differential caused by opening the spigot as described; the second triggering event can be, e.g., a subsequent pressure differential caused by closing the spigot. Accordingly, a user may activate the pump 120 to dispense the contents of the main container 101 by opening spigot 105 and stop the pump 120 by closing spigot 105.

In this and other embodiments, actions of the logic board and components of the cooler (e.g., pump 120) can be controlled by software instructions stored in a memory such as RAM or ROM memory on the logic board. The logic board can also include one or more processors in signal communication with the memory and output channels configured to activate the pump and carry out any other functions of the stored software.

In this and other embodiments, cooler 100 is operable to dispense any type of liquid from spigot 105 that the pump 120 is capable of pumping. One advantage, of many, of the cooler system 100 is that the main container 101 can be filled with a pre-mixed beverage, such an alcoholic beverage and dispensed easily from any height relative to the user. This advantage eliminates the need to bend down to reach the spigot of traditional gravity-fed coolers disposed on a bottom portion. Another advantage pertains to carbonated beverages such as beer, in that the main container 101 does not need to be pressurized to dispense liquids therefrom. Accordingly, foaming and over-pressurization issues that can occur with kegs can be eliminated.

A number of illustrative embodiments have been described. Nevertheless, it will be understood that various modifications may be made without departing from the spirit and scope of the various embodiments presented herein. Accordingly, other embodiments are within the scope of the following claims.

What is claimed is:
1. A cooler, comprising:
A manually-portable shell housing defining an integrated beverage storage container structure, the shell housing comprising:

a thermally-insulated main container comprising a floor and a wall adjacent to the floor, said main container being configured to retain a volume of a liquid;

a liquid-proof electronics chamber disposed below said floor of said main container, said floor defining a transverse partition between said main container and said electronics chamber that fully separates said main container from said electronics chamber and prevents transfer of liquid therebetween;

a pump disposed entirely within said electronics chamber configured to pump fluid from a fluid inlet that is in fluid communication with said main chamber to a fluid outlet that is external to said electronics chamber;

a length of tubing having proximal and distal end portions, wherein said proximal end portion is connected to said fluid outlet on an external portion of said shell housing, and said distal end is connected to a manually-operated spigot; and an electronic control, located entirely within said electronics chamber, operatively connected to said pump to cause activation and cessation of said pump;

wherein an exterior surface of said shell comprises a recessed groove configured to receive and securely grip said length of tubing.

2. The cooler of claim 1, wherein a cross-sectional diameter of said groove matches a cross-sectional diameter of said tubing.

3. The cooler of claim 1, wherein said recessed groove comprises at least one area wherein a cross-sectional circumference is greater than a cross-sectional diameter of said tubing, so that said recessed groove assumes a cross-sectional "C" shape.

4. The cooler of claim 1, wherein said recessed groove is circumferentially disposed on said shell.

5. The cooler of claim 4, wherein said recessed groove comprises a proximal end portion beginning at said fluid outlet and extends upwardly along a circumferential pathway about said shell.

6. The cooler of claim 5, wherein a distal end portion of said recessed groove terminates at a top portion of said main container.

7. A beverage cooler, comprising:

a manually-portable shell housing defining an integrated structure, said shell housing comprising:

a thermally-insulated main liquid storage chamber and an electronics chamber, said electronics chamber being disposed entirely beneath said main liquid storage chamber and separated by a transverse floor portion of said main chamber;

a pump disposed entirely within said electronics chamber, configured to pump liquid from said main liquid storage chamber to a pump outlet;

a length of tubing having a proximal end connected to said pump outlet and a distal end connected to a manually-activated spigot; and an electronic control disposed within said electronics chamber comprising a micro-pressure switch configured to activate upon detection of a change in pressure within said length of tubing, said pump, or both;

wherein said pump is configured to pump said liquid from said main liquid storage chamber to said pump outlet when said micro-pressure switch is activated.

8. The beverage cooler of claim 7, further comprising a recessed groove extending from said pump outlet to a top portion of said main liquid storage chamber that is configured to engage and secure said length of tubing therein.

9. The beverage cooler of claim 8, further comprising:

a spigot recess for securely engaging said spigot;

wherein said spigot recess is partially formed on a top portion of said main liquid chamber, and partially formed on an outer wall portion of a lid member configured to be reversibly engaged with said main liquid chamber.

10. A beverage cooler, comprising:

a thermally insulated, main liquid storage chamber;

a pump, said pump comprising an inlet in fluid communication with said main liquid storage chamber, and an outlet in fluid communication with an actuatable fluid dispenser and an electronic pressure-sensing switch; and an electronic control in signal communication with said pressure-sensing switch and said pump;

wherein said electronic control is configured to activate said pump upon receiving a first signal from said pressure-sensing switch and deactivate said pump upon receiving a second signal from said pressure-sensing switch;

wherein:

said beverage cooler further comprises a shell housing defining an integrated structure, and a transverse partition that divides said housing between separate upper and lower portions, said transverse partition extending fully across a cross-sectional area of said housing;

said main liquid storage chamber is located in said upper portion of said housing;

the lower portion defines a liquid-proof electronics chamber located entirely below said transverse partition and housing, in their entirety, said pump, said electronic pressure-sensing switch, and said electronic control;

said beverage cooler is manually portable;

said pump is battery powered; and said upper portion and said lower portion are contained within said housing as a single, cohesive unit.

11. A cooler, comprising:

a thermally-insulated main container comprising a floor and a wall adjacent to the floor, said main container being configured to retain a volume of a liquid;

an electronics chamber disposed below said floor of said main container;

a fluid inlet in fluid or atmospheric communication with said main container, and a fluid outlet;

a pump, disposed within said electronics chamber, configured to pump fluid from said fluid inlet to said fluid outlet;

a length of tubing having proximal and distal end portions, wherein said proximal end portion is connected to said fluid outlet, and said distal end is connected to a spigot; and an electronic control operatively connected to said pump to cause activation and cessation of said pump;

wherein said electronic control comprises at least one processor, at least one memory, at least one signal input/output port, a power source, and is in electronic signal communication with at least one micro-pressure switch;

wherein:

said cooler further comprises a shell housing defining an integrated structure, said housing being divided between upper and lower portions by said floor of said main container, said floor extending transversely and fully across a cross-sectional area of said housing;

said main container is within said upper portion of said housing, and said electronics chamber is within said lower portion of said housing, the electronics chamber:
(i) is configured to prevent ingress of liquid from said main container; and
(ii) houses, in their entirety, said pump, said electronic control, and said micro-pressure switch;

said cooler is manually-portable; and said upper and lower portions are contained within said housing as a single, cohesive unit.

12. The cooler of claim 11, wherein said at least one micro-pressure switch is in fluid communication with said pump, said tubing, or both.

13. The cooler of claim 12, wherein said micro-pressure switch is configured to activate when a first pressure change is detected within a fluid reservoir of said pump, said tubing, or both.

14. The cooler of claim 13, wherein when said micro-pressure switch is activated, said electronic control is configured to send an activation signal to activate said pump via said one or more input/output ports.

15. The cooler of claim 14, wherein said electronic control is configured such that upon said micro-pressure switch detecting a second, subsequent pressure change, a deactivation signal is sent to said pump.

16. The cooler of claim 11, wherein said power source comprises one or more rechargeable batteries.

17. The cooler of claim 16, further comprising a power input disposed on an exterior wall of said cooler, said power input being in electronic communication with, and configured for recharging said one or more rechargeable batteries.

18. The cooler of claim 16, further comprising a power output disposed on an exterior wall of said cooler, said power output being in electronic communication with said one or more rechargeable batteries.

19. The cooler of claim 11, further comprising:
a recess having side-walls whose profile is complementary to an exterior profile of said spigot, the recess and said spigot being dimensioned to create an interference fit that frictionally retains said spigot when said spigot is inserted into said recess;
wherein a first portion of said recess is disposed an exterior wall of said main container, and a second portion of said recess is disposed on an exterior wall portion of a lid member, wherein said lid member is configured for reversible securement to said main container.

* * * * *